United States Patent [19]

Goedken et al.

[11] Patent Number: 5,485,513
[45] Date of Patent: Jan. 16, 1996

[54] CIRCUIT AND METHOD FOR AUTOMATIC MEMORY DIALING

[75] Inventors: James F. Goedken, Arlington Heights; Charles J. Malek, Crystal Lake, both of Ill.

[73] Assignee: Motorola, Inc., Schaumburg, Ill.

[21] Appl. No.: 113,567

[22] Filed: Aug. 27, 1993

[51] Int. Cl.[6] .................................................. H04M 1/27
[52] U.S. Cl. .......................... 379/355; 379/354; 379/359
[58] Field of Search .................................. 379/355, 354, 379/359, 356, 357

[56] References Cited

U.S. PATENT DOCUMENTS

| | | | |
|---|---|---|---|
| 3,988,550 | 10/1976 | Ts'ao | 379/355 |
| 4,039,761 | 8/1977 | Nicoud et al. | 379/355 |
| 4,342,882 | 8/1982 | Gravenhorst et al. | 379/355 |
| 4,571,463 | 2/1986 | Shefler | 379/355 |
| 4,741,029 | 4/1988 | Hase et al. | 379/355 |
| 4,985,918 | 1/1991 | Tanaka et al. | 379/355 |
| 5,127,045 | 6/1992 | Cragun et al. | 379/355 |
| 5,220,594 | 6/1993 | Ohnishi et al. | 379/355 |
| 5,384,825 | 1/1995 | Dillard et al. | 379/59 |

*Primary Examiner*—Jeffery A. Hofsass
*Assistant Examiner*—Jacques M. Saint-Surin
*Attorney, Agent, or Firm*—John J. King

[57] ABSTRACT

A method provide delays during memory dialing by automatically inserting pause characters within the dialing sequence based upon the user's entry of the dialing sequence. The method establishes a time-out period (64) when storing dialing sequences, and adds a pause character (66) to the dialing sequence if the time-out has expired. The method also determines whether any digit keys have been selected (68) to be stored in the sequence. Finally, the method monitors the tip and ring line of a standard telephone line to detect a far end ringing signal (76) and insert a special pause character (78). The special pause character will provide a delay until a far end pickup is detected during automatic dialing. Also, a circuit includes a keypad (20) for selecting digits to be stored; a control circuit (18) for detecting a delay between the selection of digits and generating a first pause signal in response; and a digital signal processor (30) for detecting a far end ringing signal to generate a second pause signal; and a memory device (26) for storing said digits and pause signals.

19 Claims, 4 Drawing Sheets

CIRCUIT AND METHOD FOR AUTOMATIC MEMORY DIALING

FIELD OF THE INVENTION

The present invention is generally related to memory dialing, and more particularly to a circuit and method for generating and storing special characters in a dialing sequence.

BACKGROUND OF THE INVENTION

Previously, memory dialing for telephones has been primarily restricted to simple telephone numbers where any delay between digits dialed was relatively unimportant. The number could be dialed at any continuous rate as long as it was within the telephone company's specifications. Accordingly, only the digits selected to be dialed were stored in the memory and later dialed at a constant rate. That is, no additional characters, such as pause characters, were included in the dialing sequence.

However, as more computer controlled services were connected to the telephone system, additional functions were required for automatic memory dialing in many cases. For example, banking or calling card access may require pause characters in the dialing sequence to allow time to access the particular computer controlled service. Further, other special numbers may require a delay to complete the dialing sequence. For example, when accessing a telephone outside of a local system, a "9" followed by a delay may be required to get out of a local system. Similarly, delays may be required at certain positions in the dialing sequence in order to cover speech synthesis for a voice-prompted paging system. Accordingly, some telephone devices having memory dialing capability have included a "pause key" which allows the user to manually insert a pause character at any point in the dialing sequence. When selected, the pause character represents a short delay (e.g. one second) that would occur during memory dialing process before additional characters would be dialed. Multiple pause characters could be linked to obtain a longer delay as required.

In spite of the ability of a user to manually insert a pause character in a dialing sequence, manually inserting pause characters is often difficult for more complex systems. Because it may be difficult to judge the number of pauses required for a particular dialing sequence, a long trial and error process is often necessary to adequately insert pauses. In some cases, it may be impossible to insert the proper number of pauses. For example, inserting pauses to wait for a far end pickup may be impossible because some systems may answer after a variable number of rings. That is, while a telephone system may generally respond to a call after a certain number of rings, the number of rings may vary depending upon the load on the system. Therefore, preprogramming a fixed number of pauses to provide a predetermined delay may not always be possible.

Accordingly, there is a need for a circuit and method for memory dialing which automatically stores pauses or other command signals in a dialing sequence based on upon the user's entry of the digits in the dialing sequence. Further, there is a need for a circuit and method for automatic dialing which is responsive to the called party telephone system to accommodate telephone systems which may respond to a call after a variable number of rings.

BRIEF DESCRIPTION OF THE DRAWINGS

In describing the circuit and method for automatic memory dialing, reference is made to the following drawings wherein.

DESCRIPTION OF THE PREFERRED EMBODIMENTS

Because of the complexity of memory dialing sequences associated with pagers or computer controlled services accessible by the telephone line, a system is required which will "memorize" the dialing operation of a user during the entry of a particular directory number to provide adequate delays when the number is dialed automatically during memory dialing. That is, according to one aspect of the invention, pauses are automatically inserted within the dialing sequence when delays are detected as the number is manually entered by the user. Preferably, the pauses are entered as the number is entered when the telephone is off hook. The digits and pauses are stored in memory and can be reproduced at a later time during memory dialing.

Further, different types of pause characters can be included in the dialing sequence according to a further aspect of the invention. A first type of pause character can merely provide a delay before the next digit in the sequence is dialed. These pause characters can be linked to provide a delay equal to the delay between digits entered by the user. Alternatively, a special pause character is inserted in the dialing sequence in response to the detection of a far end ringing signal. The special pause character will provide a delay from the entry of the previous digit until a far end pickup is detected during automatic memory dialing. Although the various pause characters are entered automatically, pause characters and special pause characters can be manually inserted by the user when storing a dialing sequence to provide the same benefit during automatic memory dialing. As will be described in detail below, the circuit and method of the present invention will accommodate automatic memory dialing to any type of pager or telephone system.

Figure 1:
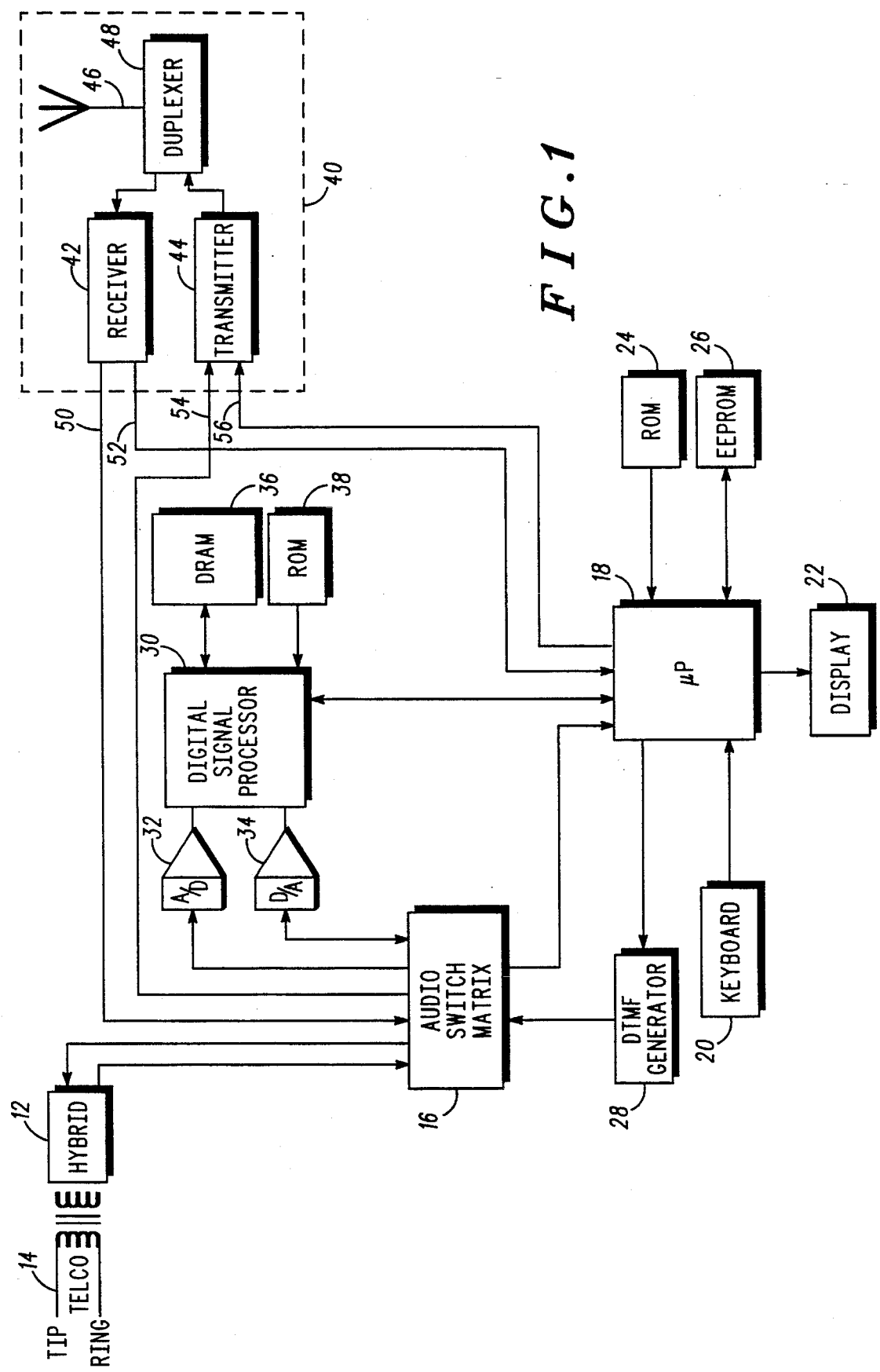
FIG. 1 is a block diagram of a circuit for memory dialing according to the present invention.

Turning now to FIG. 1, a block diagram of a circuit 10 for automatic memory dialing is shown. Circuit 10 includes a hybrid circuit 12 coupled to a telco line 14 having standard TIP and RING lines. The hybrid circuit generally communicates with an audio switch matrix 16. Audio switch matrix 16 provides signals for a control circuit such as a microprocessor 18, which generally controls the operation of circuit 10. A keypad 20 is also coupled to microprocessor 18. Keypad 20 allows a user to enter the digits to be stored in the dialing sequence, to select any type of pause characters to be manually inserted for memory dialing, or to select a dedicated memory location for storing a dialing sequence. Circuit 10 could also include a display 22 coupled to microprocessor 18 to display selected digits to ensure that the correct dialing sequence has been stored.

Microprocessor 18 monitors the input of digits from keypad 20 to detect delays during the input of digits by the user. Microprocessor 18 is preprogramed to automatically perform the steps of the method for automatic memory dialing described infra. The microprocessor automatically inserts pause characters in the dialing sequence representing the delay between the entry of digits. Preferably, the pause characters are automatically inserted in the dialing sequence when the telephone is off hook. However, pause characters could be automatically inserted when storing a dialing sequence when the telephone is on hook. As will be noted infra, the special pause characters, which are inserted when a far end ringing signal is detected, can only be inserted when the telephone is off hook.

When automatically inserting pause characters, the microprocessor could continuously establish a time-out period and insert a pause character at the end of the time-out period until a digit is entered. The pause characters would therefore be linked to provide a delay during automatic memory dialing equal to the delay experienced during dialing and storage of the sequence. Alternatively, a character requesting a pause, followed by a character indicating the duration of the pause, could be included to generate longer pauses. For example, a "pause for X seconds" character could be followed a "5" character to generate a 5 second delay during dialing. Accordingly, only two characters would be required in the dialing sequence to generate a pause equivalent to five pauses.

Memory devices are also incorporated in circuit 10. In particular, a read only memory (ROM) 24 contains stored programs for performing telephone functions. Also, an electrically erasable programmable read only memory (EEPROM) 26 is coupled to microprocessor 18 for storing the dialing sequences. EEPROM 26 is capable of storing any digits or pause characters selected by the user by way of keypad 20, or pause characters automatically inserted in the dialing sequence by microprocessor 18.

A dual tone multi-frequency (DTMF) generator 28 also receives signals from microprocessor 18 to generate DTMF signals on the telco line by way of audio switch matrix 16. During automatic dialing of the stored dialing sequences, the DTMF signals are generated at a rate controlled by the microprocessor to accommodate for the pause characters or special pause characters stored in the dialing sequence.

In a device adapted to transmit stored digital signals to or receive digital signals from a device over the telco line, a signal processing circuit such as a digital signal processor 30 could be employed. Digital signal processor 30 is coupled by a bi-directional bus 31 to communicate with microprocessor 18. Digital signal processor 30 generally receives and transmits signals by way of an analog-to-digital converter 32 and a digital-to-analog converter 34 which are coupled to audio switch matrix 16. A DRAM 36 and a ROM 38 are associated with digital signal processor 30 for storing message information in a telephone system incorporating the circuit and method of the present invention.

Digital signal processor 30 is also capable of detecting a far end busy signal or ringing signal on telco line 14 by way of audio switch matrix 16, and outputting an indication to microprocessor 18 on bi-directional bus 31 in response to detecting a far end ringing signal. The special pause character inserted into the character string to be parsed and dialed causes the "wait-for-far-end-pickup" operation. That is, a delay is provided until a far end pickup is detected. Accordingly, the special pause character enables automatic dialing to a telephone system which may answer after a variable number of rings.

Finally, in a cordless telephone incorporating the circuit and method of the present invention, a transceiver 40 for communication with a cordless handset is provided. Transceiver 40 generally includes a receiver 42 and a transmitter 44 which are coupled to an antenna 46 by way of a duplexer 48. Generally, receiver 42 provides audio signals to audio switch matrix 16 by way of audio line 50 and data signals to microprocessor 18 by way of data line 52. Also, transmitter 44 receives audio signals from audio switch matrix 16 by way audio line 54 and data signals from microprocessor 18 by way data line 56.

Figure 2:
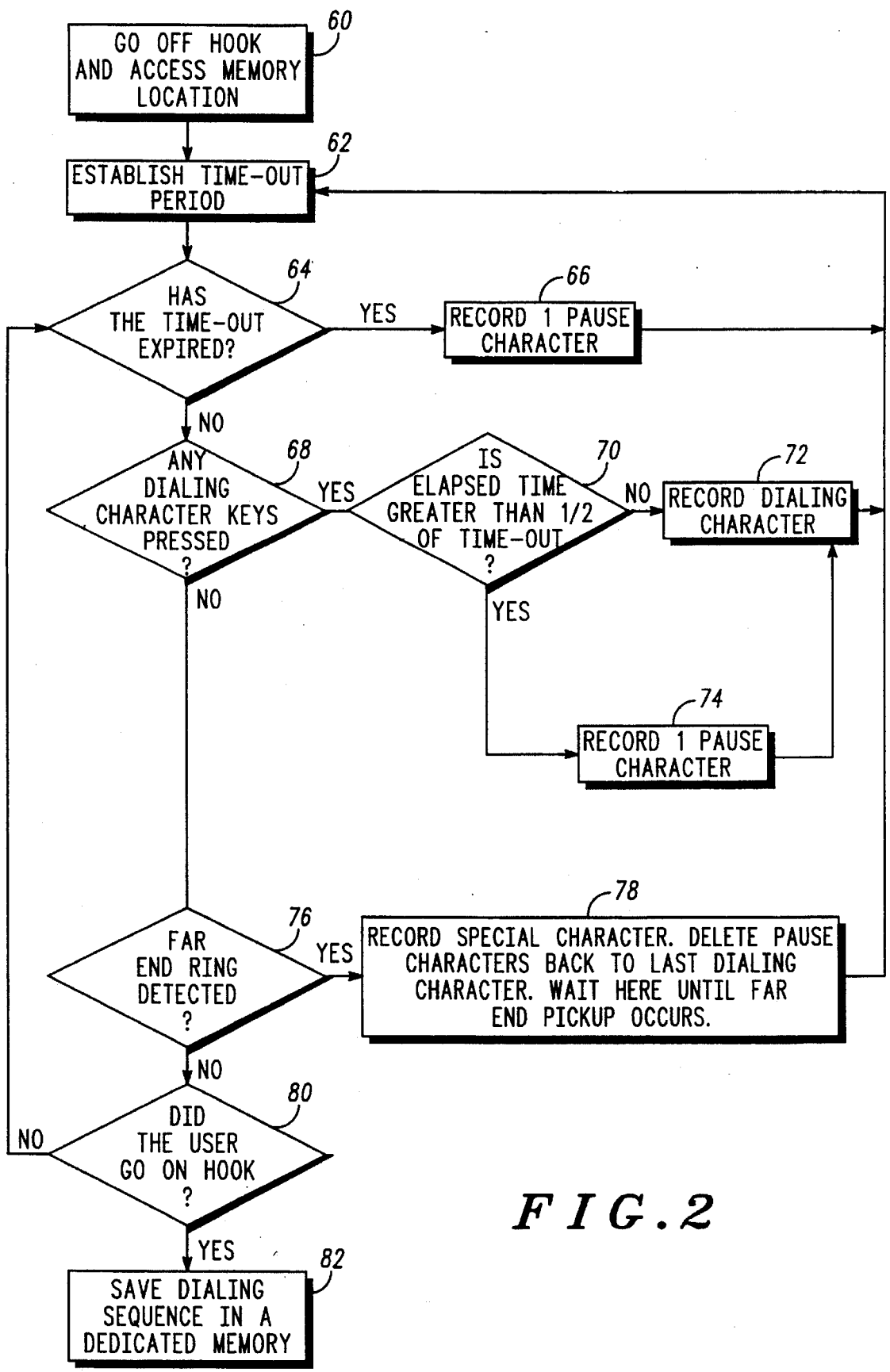
FIG. 2 is a flow chart showing the storing of a dialing sequence according to the present invention.

Turning now to FIG. 2, the preferred method for storing a dialing sequence according to the present invention is shown. Unless otherwise noted, the steps of the present invention could be performed by microprocessor 18 of FIG. 1. A user will go off hook and access a memory location at a step 60. The memory location could be a dedicated memory location in the EEPROM for storing digits or other characters. Alternatively, the user may be required to access a special mode for recording dialing sequences including the pause characters automatically inserted according to the present invention. After accessing the memory location, a time-out period is established at a step 62. For example, a one second timer could be established in microprocessor 18 of FIG. 1. The time-out period is monitored at a step 64 to determine whether the time-out has expired. If the time-out has expired, a pause character will automatically be inserted into the memory dial sequence at a step 66, and the time-out period will be reset at a step 62. Pause characters entered at step 66 could be linked to provide an extended delay, or a single pause character which will extend for a predetermined period of time could be entered in the sequence.

After the timer has been checked at step 64, the selection of a dialing character (i.e. a digit) for generating a DTMF signal is monitored at a step 68. If a dialing character has been selected, the circuit will determine whether more than one half of the time-out period has elapsed at a step 70. If less than one half of the time-out period has elapsed, the selected dialing character will be recorded in the dialing Sequence at step 72, and the timer will be reset at step 62. However, if more than a one half of the time-out period has elapsed, a pause character will be inserted at a step 74 before the selected dialing character is inserted at step 72.

If no dialing characters are detected at step 68, the detection of a far end ringing signal is monitored at a step 76. Generally, digital signal processor 30 of FIG. 1 could detect presence of a far end ringing signal. If a far end ringing signal is detected, a special pause character representing a "wait for far end pickup" character in the dialing sequence is recorded at a step 78. Any pause characters following the last dialed digit (i.e. recorded at step 66) are replaced with the single special pause character. The special pause character will provide a delay from the last dialed digit until a far end pickup is detected. After the special pause character is inserted in the dialing sequence, the timer is disabled until another dialing character is selected or a far end pickup is detected. The time-out period is then established at step 62 after a far end pickup is detected.

Finally, if no dialing character or far end ringing signal is detected, the telephone system will be monitored for an on hook state at a step 80. If the user has gone on hook, the dialing sequence is saved in the dedicated memory and the method is ended at a step 82. However, if the user has not gone on hook, the state of the time-out period will be monitored at step 64.

Although the preferred method of storing a dialing sequence includes the automatic insertion of pause characters and special pause characters during the dialing of a number as described above in reference to FIG. 2, it is understood that the pause characters and the special pause characters could be inserted manually by the user within the scope of the present invention. In particular, a user can estimate the delay required to cover speech synthesis when dialing to a voice prompted system. Similarly, a special pause can be inserted manually when a far end ringing signal is detected.

Further, pause and special pause characters could be inserted during storage of the dialing sequence when on hook. In particular, pause characters could be entered manually or automatically during an on hook storing of a sequence. Although adequately covering the speech synthesis with pause characters may require trial and error, the duration of the speech synthesis in the voice prompted system should not change. Because a special pause character is entered in response to a far end ringing signal, the special pause character can only be entered manually when on hook. However, the special pause character will provide the same benefit during automatic dialing whether inserted manually or automatically.

Figure 3:
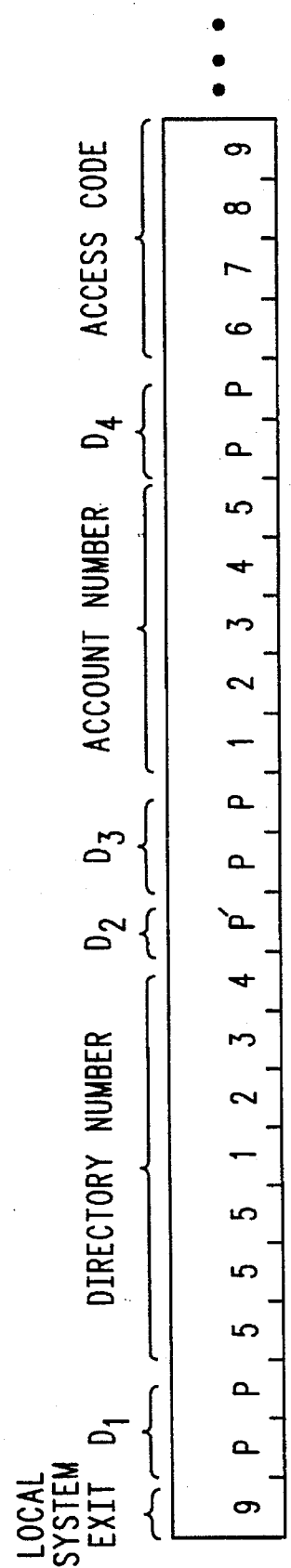
FIG. 3 is an exemplary diagram of a resulting dialing sequence for automatic memory dialing according to the present invention.

Turning now to FIG. 3, an example of a stored dialing sequence is shown. The stored dialing sequence of FIG. 3 may represent a number to access a bank account, for example. To access a class 5 switch of a local PBX, a digit "9" is entered. A delay $D_1$ having two pause characters each designated with a "P" is recorded. This delay is recorded as the user waits to receive a dial tone after dialing "9" to get out of the local system. These pause characters could be entered manually by the user, or preferably the pause characters are entered automatically as described above in reference to FIG. 2. A directory number "555-1234" is then entered by the user. A delay period $D_2$, represented by the special pause character "P'", is entered in the dialing sequence after the directory number. The special pause character is inserted after a far end ringing signal is detected. The special pause character P' replaces any previous pause characters P which may have been inserted before a far end ringing signal was detected. Therefore, the special pause character provides a delay during automatic dialing from the last entered digit until a far end pickup occurs.

Another delay $D_3$ represented by two pause characters is inserted after the special pause character. These two pause characters may provide a delay for a message from the called device. For example, the message may be a prompt for the user to enter an account number. An account number "12345" is then entered by the user. Another delay, $D_4$, represented by two pause characters is included in the dialing sequence. This delay could correspond to another voice prompt from the far end device requesting an access code, for example. Finally, an access code "6789" is entered. Additional characters could be entered as required, depending upon the number being called.

Figure 4:
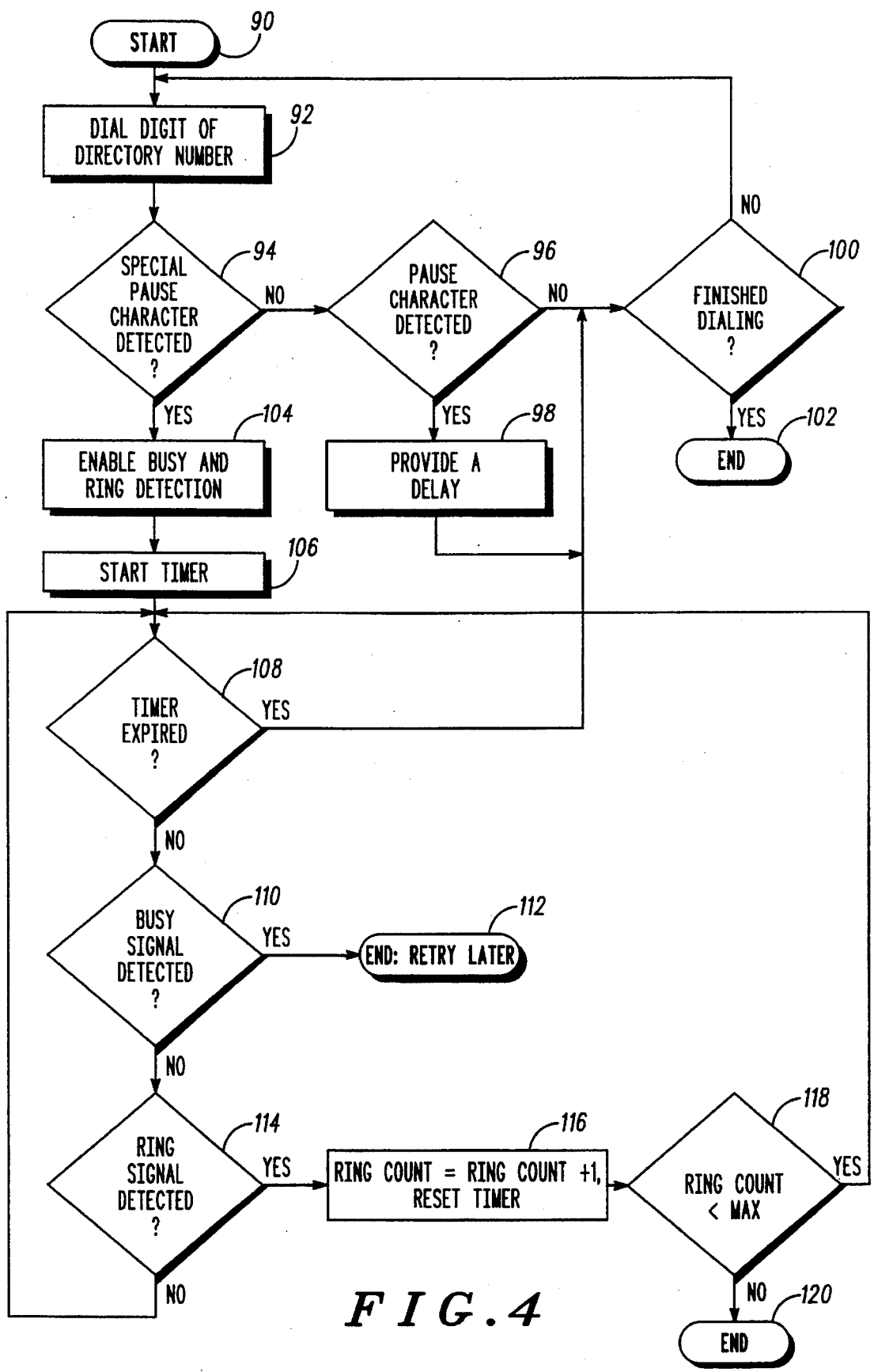
FIG. 4 is a flow chart showing a method for memory dialing according to the present invention.

Turning now to FIG. 4, the method for automatic dialing of a stored dialing sequence according to the present invention is shown. At a step 90, the user selects a memory dialing location having a dialing sequence stored therein. The first digit or character of the stored directory number will be dialed at a step 92. The dialing sequence will be monitored for a special pause character within a sequence at a step 94. If a special pause character is not detected, the sequence will be monitored for a pause character at a step 96. If the pause character is detected, a delay will be provided at a step 98. If it is determined that the dialing sequence is completed at step 100, the method for automatic memory dialing is ended at a step 102. However, if the dialing is not completed, the next digit or character is dialed at step 92 and the dialing sequence is monitored for pause characters and special pause characters If a special pause character is detected at step 94, steps are followed to detect a far end pickup. In particular, busy and ring signal detection circuitry will be enabled at a step 104. Generally, if no busy or ring signal is detected within a predetermined period of time, a far end pickup will have occurred. Accordingly, a timer will be started at a step 106 and will be monitored at a step 108. In particular, the timer will be set to allow adequate time to detect a busy or ring signal from the far end device. The telco line will be monitored for a busy signal from the far end device at a step 110. If a busy signal is detected, the method for automatic memory dialing is ended at step 112. In such a case, the automatic memory dialing of the particular number could be retried at a later time.

If no busy signal is detected at step 110, the telco line is monitored for a ringing signal from the far end device at step 114. If a ringing signal is detected, a "ring count" indicating the number of rings is advanced and the timer is reset at a step 116. If the ring count is greater than the maximum number of rings, the method for memory dialing is ended at a step 120. A further attempt to call the same number could be made after a predetermined delay, or an alternate number could be dialed. However, if the ring count has not exceeded the maximum number of rings, the timer is then monitored at a step 108 to determine whether the timer has expired, or a busy or ring signal is detected at steps 110 or 114, respectively.

Finally, if no busy signal is detected at step 110 and no ring signal is detected at step 114 (i.e. a far end pickup has occurred), the timer is monitored at step 108. When the timer has expired at step 108, the completion of the dialing will be determined at step 100. It should be noted that steps 104–118 could be eliminated in an ISDN system where a far end pickup signal could be detected on the telco line.

In summary, the circuit and method of the present invention allow a user to store dialing sequences for automatic memory dialing wherein pause characters are automatically inserted in the dialing sequence. A first type of pause character may be automatically inserted in the dialing sequence to represent the delay between entry of selected digits by the user. A second type of pause character may be inserted if a far end ringing signal is detected. The second type of pause character would provide a delay during the automatic dialing from the entry of previous digit until a far end pickup is detected. Although the pause characters could be entered manually, the circuit and method of the present invention eliminate the requirement that a user manually insert pause characters and eliminate the guesswork associated with providing the correct number of pauses. More importantly, the present invention enables automatic memory dialing in situations where the required number of pauses may vary, making automatic memory dialing impossible. That is, a fixed number of pause characters may not consistently enable automatic dialing if the far end device may answer after a variable number of rings. Accordingly, the circuit and method of the present invention enables automatic memory dialing to complex telephone systems.

It should be noted that the block diagram of FIG. 1 is one example of a circuit which could employ the method of the present invention. However, it will be understood that other circuits or recording devices employing automatic memory dialing could incorporate the method of the present invention. The circuit and method of the present invention can find particular application with any device adapted for "call forwarding". That is, the circuit and method can be particularly useful in an environment where a user is not available to manually dial the sequence should automatic dialing of a particular sequence fail.

Particular reference is made to U.S. application Ser. No. 08/070,600, filed Jun. 1, 1993 by James F. Goedken, Charles J. Malek and John Gilbert and assigned to the assignees of the present invention. This application is entitled "A METHOD FOR LOCATING A USER OF TELEPHONE SUBSCRIBER EQUIPMENT" and is directed to a method for automatically forwarding a recorded message or a call in real time to one of a series of destinations. The destinations could include another telephone or a pager which has a complex dialing sequence. Accordingly, the circuit and method of the present invention would enable automatic message forwarding to any type of device such that message forwarding would not be limited by the complexity of the telephone system receiving the forwarded call.

While the present invention describes two types of pause characters which could be inserted in the dialing sequence, other types of characters are contemplated within the scope of the present invention. For example, characters which provide interactive communication between the called system and the calling system could be included. Accordingly, the present invention is intended to include any variations within the spirit and scope of the specific embodiments disclosed, and the scope of the invention is defined by the following claims.

We claim:

1. A method for storing a dialing sequence with a telephone device having a keypad for entering digits and a memory for storing digits, said telephone device being adapted to automatically transmitting said dialing sequence when dialing and during a call, said method comprising the steps of:

selecting a location in the memory for storing the dialing sequence;

selecting digits to be stored in the dialing sequence through entry on the keypad;

automatically inserting at least one first pause character in the dialing sequence in response to detecting a far end ringing signal, the at least one first pause character providing a delay until a far end pickup is detected; and selecting at least one additional digit to be stored in the dialing sequence through entry on the keypad.

2. The method for storing a dialing sequence according to claim 1 further including a step of automatically inserting a second pause character, said second pause character corresponding to a delay period during the selection of digits to be stored.

3. A method for storing a dialing sequence in a memory of a telephone device when dialing and during a call, the telephone device having a keyboard and being adapted for automatic dialing of the dialing sequence, said method comprising the steps of:

selecting a dedicated storage location in the memory;

selecting digits to be stored in the dialing sequence;

selecting a first pause character, the first pause character providing a delay representing the period from the dialing of the immediately preceding digit in the sequence until a far end pickup is detected during the automatic dialing of the dialing sequence; and selecting digits to be stored in the dialing sequence after said first pause character.

4. The method for storing a dialing sequence according to claim 3 wherein said step of inserting a first pause character includes manually selecting a first key on the keyboard.

5. The method for storing a dialing sequence according to claim 3 further including a step of inserting at least one second pause character between selected digits in the dialing sequence, the at least one second pause character providing a predetermined delay during the automatic dialing of the dialing sequence.

6. The method for storing a dialing sequence according to claim 5 wherein said step of inserting at least one second pause character includes manually selecting a second key on the keyboard.

7. The method for storing a dialing sequence according to claim 4 wherein said step of inserting at least one second pause character includes inserting a plurality of second pause characters to provide an extended delay during the automatic dialing of the sequence.

8. A method for storing a dialing sequence when dialing and during a call, said dialing sequence being adapted for memory dialing, said method comprising the steps of:

accessing a dedicated memory location for storing the dialing sequence;

establishing a time-out period during an off hook condition when storing the dialing sequence;

detecting the selection of a digit which is to be inserted in the dialing sequence during said time-out period;

automatically inserting a first pause character at the end of the time-out period if no digit is selected;

detecting a far end ringing signal; and automatically inserting a second pause character in response to the detection a far end ringing signal, said second pause character providing a delay during automatic dialing from an immediately preceding digit in the sequence until a far end pickup is detected.

9. The method for storing a dialing sequence according to claim 8 wherein said step of establishing a time-out period is repeated until an on hook condition is detected.

10. The method for storing a dialing sequence according to claim 8 wherein the step of automatically inserting a second pause character includes deleting any first pause characters inserted after the immediately preceding digit stored in the dialing sequence.

11. A method for automatically transmitting a stored dialing sequence when dialing and during a call, said dialing sequence having digits and pause characters, said method comprising the steps of:

generating signals representing digits stored in the sequence;

providing a first delay until a far end pickup is detected during said automatic dialing; and transmitting dual-tone multi-frequency signals representing remaining digits stored in the sequence.

12. The method for automatic dialing a stored dialing sequence according to claim 11 wherein said step of providing at least one predetermined delay includes detecting a first pause signal in said dialing sequence.

13. The method for automatic dialing a stored dialing sequence according to claim 11 wherein said step of providing a second delay includes detecting a second pause signal in said dialing sequence.

14. A circuit for generating and storing dialing characters of a dialing sequence in a device adapted for automatic memory dialing when dialing and during a call, said circuit comprising:

a keypad for selecting digits to be stored in said dialing sequence;

a control circuit coupled to said keypad, said control circuit detecting a delay in the selection of digits at said keypad;

a signal processing circuit coupled to a telco line, said signal processing circuit detecting a far end ringing signal on said telco line;

at least one first pause signal generated by said control circuit after detecting a delay in the selection of digits to be stored in said dialing sequence, said at least one first pause signal being automatically inserted in said dialing sequence in response to the detection of a far end ringing signal by said signal processing circuit, said first pause signal providing a delay from an immediately preceding selected digit until a far end pickup is detected by said processing circuit; and a memory device for storing said dialing sequence including selected digits and said at least one first pause signal automatically inserted in said dialing sequence.

15. The circuit for generating and storing dialing characters according to claim 14 further including at least one second pause signal.

16. The circuit for generating and storing dialing characters according to claim 15 wherein said second pause signal provides a delay corresponding to a delay in the selection of digits.

17. The circuit for generating and storing dialing characters according to claim 14 further including a plurality of second pause signals, said second pause signals being of a predetermined duration and being linked to establish a delay corresponding to said delay in the selection of digits to be stored in the dialing sequence.

18. The circuit for generating and storing dialing characters according to claim 14 wherein said memory device comprises an electrically erasable programmable read only memory.

19. A circuit for generating and storing characters of a dialing sequence in a device adapted for automatic dialing and coupled to a telco line, said circuit comprising:

a keypad for selecting digits to be stored in said dialing sequence;

a microprocessor coupled to said keypad, said microprocessor detecting a delay in the selection of digits at said keypad;

a digital signal processor coupled to said telco line, said digital signal processor detecting a far end ringing signal at said telco line;

at least one first pause signal generated by said microprocessor after detecting a delay in the selection of digits to be stored in said dialing sequence, said first pause signal being automatically inserted in said dialing sequence and providing a delay corresponding to said delay in the selection of digits;

at least one second pause signal generated by said microprocessor in response to the detection of a far end ringing signal by said digital signal processor, said second pause signal being automatically inserted in said dialing sequence and providing a delay from an immediately preceding selected digit until a far end pickup is detected; and an electrically erasable programmable read only memory for storing said dialing sequence including selected digits, said at least one first pause signal and said at least one second pause signal automatically inserted in said dialing sequence.

* * * * *